Aug. 16, 1960
J. HAPPEL ET AL
2,949,493
PRODUCTION OF DIVINYL ACETYLENES BY THE DEHYDRATION OF VINYL
ACETYLENIC ALCOHOLS IN THE PRESENCE OF STEAM
Filed Oct. 3, 1958
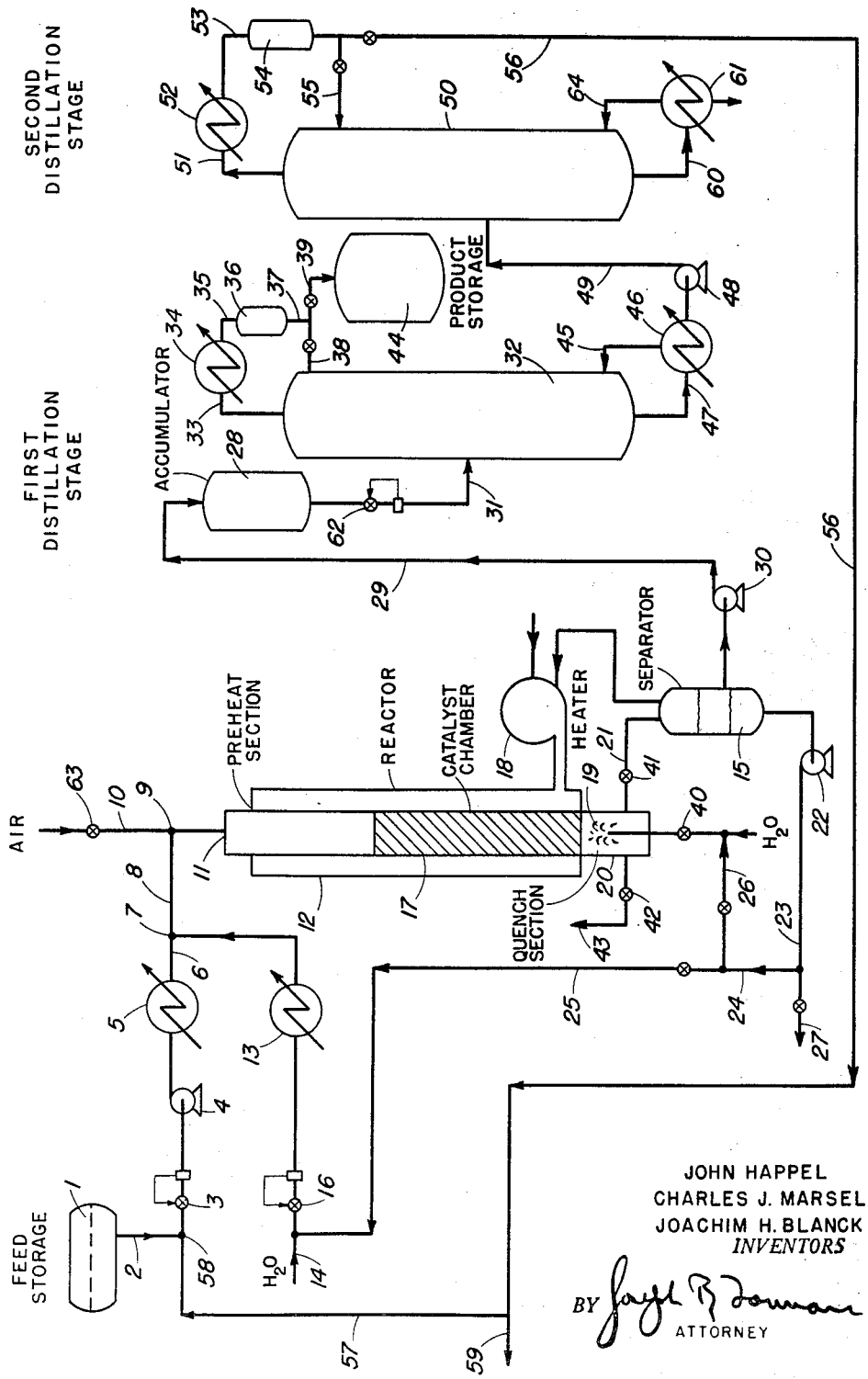
JOHN HAPPEL
CHARLES J. MARSEL
JOACHIM H. BLANCK
*INVENTORS*
BY *[signature]*
ATTORNEY

United States Patent Office 2,949,493
Patented Aug. 16, 1960

2,949,493

PRODUCTION OF DIVINYL ACETYLENES BY THE DEHYDRATION OF VINYL ACETYLENIC ALCOHOLS IN THE PRESENCE OF STEAM

John Happel, Hastings-on-Hudson, N.Y.; Charles J. Marsel, New York, N.Y.; and Joachim H. Blanck, Flushing, N.Y. (All of Department of Chemical Engineering, New York University, New York 53, N.Y.)

Filed Oct. 3, 1958, Ser. No. 765,163

7 Claims. (Cl. 260—678)

This invention relates broadly to a novel process for the production of divinyl acetylenes from vinyl acetylenic alcohols. More particularly, it relates to a novel method for the production of the divinyl acetylenes, such as methyldivinylacetylene by the vapor phase dehydration of tertiary vinyl acetylenic alcohols, using preferably alumina catalysts, and employing diluents and reaction conditions to obtain the acetylene product with a minimum formation of undesirable by-products and without appreciable loss of either the starting alcohol or of the vinyl acetylene product.

The divinyl acetylene compounds present certain unique difficulties in their production on a large, commercial scale and in continuous operations. Their most logical preparation is from the corresponding tertiary acetylenic carbinols, which are by their very nature, themselves highly unstable. When subjected to dehydration conditions, undesirable side reactions have been shown to occur, including the reactions of isomerization, polymerization and reversal of the reaction which produced the carbinol originally. Thus, in the past, the divinyl acetylenes have been prepared on a relatively small laboratory scale by batchwise liquid phase reactions. Early work on these liquid phase reactions used as catalysts such reagents as sulfuric acid, acetic anhydride, or para-toluene-sulfonic acid. In these reactions, the yields were low and the batchwise, complicated methods involved were not adaptable to continuous, large scale operations.

As a result of this, the catalytic vapor phase process was studied because of its more ready adaptability to continuous operation which is highly desirable from the standpoint of commercialization. However, the side reactions continued to occur, thereby destroying valuable products and starting materials, producing complex product mixtures difficult to separate and requiring frequent catalyst changes or regeneration due to the short lived period of catalyst activity.

Specially prepared catalysts were sought to overcome these difficulties. Such special catalysts include alumina impregnated with acids or sulfates or catalysts containing phosphates. These specially prepared catalysts showed good activity for only a short period of time, making continuous operations impossible. In addition, they, too, produced a multiplicity of by-products.

Recent work has succeeded in producing unsaturated acetylenes by the thermal pyrolysis of tertiary acetylenic carbinols. In this method, no catalyst was used but this process necessitated the use of high temperatures with the well-known attendant difficulties.

It has been discovered that it is entirely practical and, in fact, commercially attractive to prepare the divinyl acetylenes from tertiary vinyl acetylenic alcohols. In general, the reaction utilized to prepare these compounds comprises the vapor phase dehydration of a tertiary alcohol in which there is also present in the molecular at least one acetylene bond (a carbon to carbon triple bond).

The general nature of the dehydration reaction involved is indicated by the following equation:

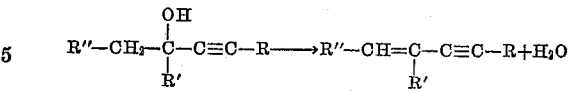

Where R, R', R" designates either an alkyl radical or a hydrogen atom. Preferably, the hydroxyl group is tertiary, that is R' is an alkyl radical. Also preferably, for purposes of this invention, there is present in the molecules at least one vinyl group (a carbon to carbon double bond).

For the purposes of showing an example, the alcohol used was dimethylvinylethinyl carbinol; the analogous equation to the above being:

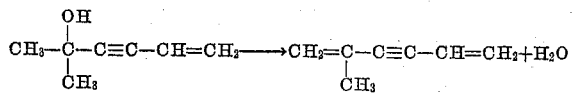

The dehydration product produced is methyl divinyl acetylene.

By means of the improved, continuous process herein described the tertiary hydroxyl group of the tertiary alcohol is converted to a carbon to carbon double bond by dehydration over an alumina catalyst with high conversion of the starting reactant to the desired product. The organic feed material need not consist of the pure acetylenic carbinol as heretofore required, but may consist of the carbinol and such diluents as xylene or toluene such as may be used in the preparation of the said carbinol. Operating in this manner, a separation process is eliminated between the condensation of the carbinol and its dehydration.

The starting reactants which may be used in this process include as above described the tertiary vinyl acetylenic alcohols, for example dimethylvinylethinylcarbinol. Other vinyl acetylenic compounds which can be dehydrated by this method are methylvinylethinylcarbinol, methylethylvinylethinylcarbinol, diethylvinylethinylcarbinol, methylisopropylvinylethinylcarbinol, and the like. The products resulting therefrom would be divinylacetylene, dimethyldivinylacetylene, methylethyldivinylacetylene, trimethyldivinylacetylene, and so on.

Whereas, in previous work specially prepared catalysts were necessary, by this process, commercially available alumina catalysts are used to effect the desired dehydration to produce the desired divinyl acetylenes in high yields.

The catalyst which is preferred for use in this process is an alumina catalyst, such as those available commercially with an aluminum oxide base, and these catalysts may also contain as activators, promoters, supports, and the like, such materials as silica, titania, iron and sodium, the major portion consisting of alumina (aluminum oxide). While the exact nature and composition of the dehydration catalyst is not unduly critical, it is surprising that an alumina base solid catalyst is satisfactory for use, since it would be expected that such a catalyst would become inactivated in the presence and under the influence of the easily resinifiable tertiary vinyl acetylenic alcohols. Such has been discovered not to be the case, and this is believed to be a further feature of the invention.

Whereas in the past it was reported that injecting 0.25 to 0.50 mole of water to moles of carbinol to an impregnated catalyst cause the carbinol to isomerize to unsaturated aldehydes and ketone, it has now been found that when using alumina, much larger quantities of water (10 to 25 moles water per mole of carbinol) have the beneficial effect of inhibiting the side reactions of polymerization, isomerization, reversion, and catalyst deactivation, a phenomenon heretofore unknown. For instance, the life of the alumina catalyst was observed over a period of seven hours at the relatively high temperature of 300° C. and with a water to carbinol ratio of approximately 11. After this period of time, the selectivity shown by the catalyst was still 80% with no indication of decreasing further. The color of the catalyst after this period of time was light tan, indicating that excessive polymerization had been prevented by this addition of steam. The aciton of the steam was not to remove the carbon deposited, otherwise the evolution of CO and $H_2$ would have been noted. Since these by-products were absent, the presence of steam was shown to prevent polymerization, and thereby considerably extending the life of the catalyst and its overall usefulness.

Thus, an additional feature and one which is preferred for use with the process is the incorporation of critical amounts of water as vapor steam into the vaporized organic feed stream in order to heat and preferably to preheat the mixture up to or approaching the reactor dehydration temperature without substantial resinification of the easily polymerizable unsaturated carbinol starting material. Such effects are undesirable and would defeat the entire effect of the process, since the resin and polymer by-products quickly inactivate the solid catalyst, foul the surfaces and clog the equipment, and result in costly losses of starting material and decreased yields and conversions. An additional and unexpected feature in the use of steam is the fact that it prevents undesirable reaction from occurring directly on the catalyst surface.

The water to carbinol ratio was varied from 1 to 25. It was found that while the entire range produced results superior to those obtained when no water was present, the mid-range from about 5 to about 18 resulted in higher conversions and selectivities.

Another feature is controlled operation at flow rates sufficiently high so that equilibrium conditions are not reached in the reactor. If sufficient time is allowed for equilibrium conditions to be established, a considerable amount of isomerization and reversion occurs together with the concomitant polymerization. The result is loss of carbinol and a poor yield of the substituted divinyl acetylene. Also by operating at the preferred high flow rates the equipment size and quantity of catalyst necessary is kept to a minimum, thereby resulting in a lower investment.

It has further and surprisingly been discovered that a number of advantages are achieved by having present in the dehydration zone, a diluent such as an inert hydrocarbon. Typical examples which produce advantages are benzene, toluene, xylenes, ethylbenzene . . . or hydrocarbons such as n-octane, n-nonane, n-decane, etc. The important property of the inert diluent is that the boiling point should be in the same range as the acetylenic carbinol to be dehydrated or slightly lower, and it must be inert to the reactants and products at the reaction temperatures and under the reaction conditions employed, and of such other properties (i.e., boiling point, etc.) that it may be separated from the desired end product.

The advantages to be obtained by the incorporation of such a diluent into the feed stream are, first, it aids in preventing the carbinol from polymerizing to a hard, unuseable mass during storage before dehydration and during handling and transfer operations, second, it inhibits the inherent tendency of the acetylenic carbinol to explode, and third, since it is usually used as a solvent in the normal condensation reaction used in producing the starting carbinol, the necessity for employing an extra step for removing it prior to the dehydration is totally eliminated, thereby resulting in a more economical and efficient overall process.

Thus, as will be described in greater detail below and in the operating examples, by the proper selection of critical temperature ranges, flow rates, and water to carbinol reactant ratios, a dehydration product mixture having maximum yields of the desired substituted divinyl acetylenes is obtained, and thereafter a relatively simple separation process such as fractional distillation or some other convenient and readily available method may be used for purification, if desired.

It has been found that, in operating this improved process, flow rates in the rang of 500 to about 12,500 v./v./hr. and dehydration reactor temperatures in the vicinity of 150° C. up to about 400° C. produce excellent product yields, and, under these conditions, the reaction proceeds in a controlled and satisfactory manner at substantially atmospheric pressure, which is preferable with these somewhat sensitive acetylenic compounds.

It is contemplated as a broader aspect of the invention that the organic feed material may be the pure carbinol or there is preferably used a mixture of the particular carbinol diluted with the appropriate, selected organic diluent, a convenient one being xylene, the proportions of which may be varied over wide limits with respect to the carbinol. In addition, in the preferred embodiment of the invention, water vapor, or steam, in water to carbinol ratios at least greater than 1 to 1 mole ratio, is admixed with the organic feed, preferably both components being vaporous when mixed and preferably being mixed prior to the entrance of the carbinol feed into the preheater portion of the reactor system.

One of the further preferred features of this invention is that it is especially applicable to the manufacture of methyldivinylacetylene from dimethylvinylethinylcarbinol. The preferred conditions for carrying out this conversion are temperatures of from about 250° to 300° C., an organic feed mixture of about 75% xylene and 25% carbinol, space reactor velocities of about 500 to 7,000 v./v./hr. and water to carbinol ratios of from 5 to 18 moles of water to one mole of carbinol in the feed.

In order to prevent extensive pyrolysis and thermal decomposition of the unsaturated materials in the effluent from the dehydration reactor, it is considered to be necessary to quench as quickly as possible the product gases as they leave contact with the alumina catalyst. This may be conveniently done, for instance, by the use of of water, sprayed or injected directly below the catalyst zone, or bed, into the product exit gases. The water is preferably of sufficient amount to condense substantially the total amount of exiting organic materials. The non-condensable organic products, if any, may be vented, or may be employed as a source of heat, for instance, to supply heat to the reactor or distillation columns. The condensed organic products may be separated from the water layer by decantation and are preferably fed to a separating stage such as at least one distillation zone, the overhead product being the desired substituted divinyl acetylene. The bottoms obtained from such distillation operations, after having been stripped of resinous and/or polymeric materials and of solvent, if used, may be recycled to the system and the solvent after recovery can be utilized in the carbinol condensation process which is the most common method for preparation of the starting materials for the dehydration process.

One such method for the preparation of the carbinol is the liquid phase condensation of a selected aldehyde or ketone with the desired acetylenic compound dissolved in a diluent such as xylene, under alkaline conditions.

The water fraction obtained from the quenched reaction mixture which is recovered from the decanter or otherwise, may be utilized in part as the initial steam diluent, as recycled quenching water, or it may in whole or in part be lead to a drain, and discarded. In addition, it is a further feature to this improved, continuous process in that there is provision for cyclic, or periodic admission of air or oxygen into the catalyst chamber of the reactor in order to burn off the carbonaceous deposits which collect on the walls and surfaces of the reactor, and more important, which collect on the catalyst itself and which cause partial or total inactivation. A process suitable for commercial production of substituted divinyl acetylenes from the corresponding tertiary vinyl acetylenic carbinols operated by the herein described invention thus possesses the following advantages:

(a) Ordinary commercially available alumina catalyst can be used.
(b) Continuous operation because of extended useful life of catalyst.
(c) Feed material need not be highly purified.
(d) High selectivity for desired product thereby minimizing the loss of the valuable carbinol.
(e) Ease of product separation since the organic product mixture consists essentially of the substituted divinyl acetylene.
(f) High yield and high flow rate, resulting in smaller process equipment investment.

One of the inherent difficulties with a reaction of this type is the method of analysis. In previous work where noted, fractional distillation has been employed. However, as noted by prior workers, side reactions can proceed under the conditions of temperature and pressure employed during distillation, casting doubt on the quantitative aspects of these experiments. In general, the effect of the distillation would tend to increase the apparent yield of the substituted divinyl acetylene obtained, making any process studied appear more attractive than it actually is. This difficulty was circumvented in the present case by the utilization of optical means for the quantitative determinations. The ultraviolet absorption spectra was employed for this purpose. By this means both speed and accuracy were obtained in the analysis.

In order to more fully describe and understand the invention, reference is made to the following descriptions and the accompanying figure, which depicts a schematic diagram for one embodiment of the invention. This diagrammatic representation will serve to illustrate the process when read in conjunction with the examples presented therewith, although it is in no way intended to limit the invention specifically thereto other variations and embodiments within the scope of the invention being obvious to those skilled in the art.

*Example 1*

Referring to the accompanying figure, the process may be carried out in the following manner. The organic raw materials for the process are supplied from the organic feed storage vessel or tank 1. The flow of the organic feed (about 75% by weight xylene and 25% by weight tertiary vinyl acetylenic alcohol) is obtained and controlled and regulated either from natural hydraulic pressure, and/or from a superimposed gaseous pressure above the liquid, and/or by the introduction of a suitable pump 4, into the passage line 2. Line 2 also preferably contains at least one valve or flow controller and measuring device 3 for regulating the flow of the feed to the catalytic dehydration reactor 12. The reactant feed passes through line 2 to a vaporizer and preheater 5, which is suitably heated and controlled and which converts the liquid feed to vapor and imparts at least sufficient superheat to the vapor to prevent any substantial condensation in line 6 through which the feed passes between the vaporizer 5 and the juncture 7, where superheated steam is added as a diluent to the feed. The superheat of the steam added at juncture 7 should be sufficient to prevent any substantial condensation of any part of the mixture of feed and steam as it passes through line 8 on its way to the preheat section 11, of the dehydrator reactor 12. The steam used as diluent and added at juncture 7 may be vaporized in water vaporizer from fresh water added thereto via line 14, or from recycle water via line 25, from separator drum 15. Control valve 16 is used in order to regulate and control the flow of steam which is heated in heater 13.

The mixed organic feed and steam diluent flow through line 8 and through juncture 9, and thence into the preheat section 11 of the reactor 12. Juncture 9 is provided for the purpose of admitting air or oxygen containing gas to be used for periodic regeneration of the catalyst in a manner to be described hereinbelow. The preheat chamber 11 may, for example, consist of tubular coils or it may be a continuation of the catalyst chamber 17, of reactor 12, said continuation being either empty or filled with some inert heat transfer material. The catalyst chamber 17, which is preferably positioned adjacent to the preheat chamber may consist of a relatively large diameter tube filled with the alumina catalyst, or a number of smaller tubes filled with the alumina catalyst, or it may be of the moving bed type or of the fluidized bed type of catalyst system. Since this type of equipment and method of operation is now conventional and is generally known to the art, no detailed description of the general method for carrying out this type of operation is included.

The means for heating the catalyst chamber 17 and the preheater chamber 11 may be either by a gas or oil fired burner 18, or by any other suitable and well-known heating means. It should be understood that thermocouples and other devices necessary to record and control the temperature and other conventional operations of the reactor are to be included although not necessarily shown in the diagram or described herein.

The hot product gases, leaving the catalyst chamber 17, are immediately and completely quenched by means of water sprayed or injected at inlet 19 located within quench chamber 20 directly below the catalyst chamber 17 or as near to the exit of the product gases from the catalyst or reaction chamber as possible. The quantity of water sprayed into the exit product gases should at least be sufficient to cool and condense both the unreacted organic feed, the product gases, and the steam diluent, as well as any inert organic diluent present. The product stream leaves the quench chamber 20 and passes via line 21 into the separator drum or other decanter vessel 15. Herein, the product effluent is separated into a lower aqueous layer, an upper organic layer, and a noncondensable off-gas fraction which may be burned, burner 18 to heat the reactor 12, if desired, or discarded. At least a part of the water may be recirculated by removal from the lower portion of the separator 15 and passed by means of pump 22, lines 23, 24, and 25 for use as a recycle stream as the steam diluent; or, it may be employed as a recycle stream as quench water via pump 22, lines 23, 24, and 26. Any unused portion from the recycle streams may be eliminated from the system via drain 27.

The organic layer in separator 15, which contains the desired substituted divinyl acetylene compound may be passed through line 29 and collected in an accumulator 28, the flow being maintained either by means of a pump 30, or by its own hydraulic head. From accumulator 28, the flow of the organic material is regulated by means of control valve 62, from whence the organic product is passed for suitable separation of the desired substituted divinyl acetylene. As a typical example, in the instant case, distillation equipment of conventional design is employed. A first distillation column 32 is employed for recovery of the divinyl acetylene product. As a further feature, if any substantial amount of the unreacted tertiary acetylenic carbinol starting material is present in the recovered organic material product it would be desirable and economical to recover it. This could be accomplished for example by an extraction process of conventional design, such as is known to the art, and it is therefore believed unnecessary to discuss such a process in great detail.

The organic material enters the first distillation column 32 from accumulator 28, via valve 62 and line 31. Within the distillation column, equipped with plates, or trays of conventional design, the product undergoes fractional distillation. It is heated by a waste heat recovery unit 46. The vapor streams or material passing overhead via line 33 is a substantially pure stream of the desired substituted divinyl acetylene. It is passed into condenser 34, and via line 35 into collector 36. The liquid product is removed from collector 36 via line 37, from which at least a part is preferably passed via line 38 as reflux back to column 32 and at least a part is passed via line 39 into product storage vessel 44. The bottoms stream from the distillation column 32 contains the inert organic solvent, as for example, xylene, and the higher molecular weight reaction products produced as by-products. This stream passes out of column 32, through a heat exchanger 46, and a part is recycled back to column via line 45. The remainder is passed via line 49 by means of pump 48 into a second distillation column of conventional design and equipped with plates or trays. The volatile solvent as for example, xylene is passed overhead via line 51 as an overhead vapor stream, through condenser 52, and via line 53 into collector 54. From collector 54 at least a part of the condensed liquid organic stream is recycled to column 50 as reflux via line 55 and at least a part is recycled to the initial organic feed system via lines 56, 57, and juncture 58; suitable means for propelling and controlling the stream being used, although not shown in the diagram. The remainder of the solvent recycle stream is removed from the system, and if desired is passed via line 59 to a condensation system for preparation of the carbinol reactant. The residual heavy products present in the feed stream to column 50 are passed from the bottom of the column via line 60 and into waste heater 61, from which at least a part are recycled back to column 50 via line 64 and a part are discarded.

The catalyst regeneration cycle which must necessarily be employed in order to regenerate the alumina dehydration catalyst in the catalyst chamber 17, is carried out by closing valves 3, 16, 40, and 41, which are allowed to remain open during the reaction cycle described above. Valves 63 and 42 are opened and air or oxygen containing gas is passed through the catalyst chamber at a rate such that the dehydration catalyst is not unduly overheated. The combustion gases formed as a result of the burning of the carbonaceous deposits from the catalyst are vented through valve 42 and vent 43. The regeneration cycle for the catalyst is discontinued when analysis of the vent gases for CO or $CO_2$ indicates that all or substantially all of the carbon deposit has been burned off. Before admitting the organic vapors to resume the dehydration cycle, it is necessary to purge the system of air. This is accomplished by closing valve 63, opening valve 16, and admitting steam to line 8, preheat section 11, catalyst chamber 17, and quench chamber 20. The residual air and steam leave the system through vent 43. The dehydration cycle is repeated by closing valve 42, and opening valves 3, 40, and 41.

*Example 2*

Referring again to the accompanying diagrammatic figure, the process may be carried out in a substantially continuous manner to produce methyldivinylacetylene by the dehydration of dimethylvinylethinylcarbinol using an inert organic diluent, preferably xylene, and an alumina catalyst bed.

The organic raw materials for the process are preferably a mixture of the proportions, 3 parts by weight of dimethylvinylethinylcarbinol and 1 part by weight xylene which has been obtained for example by condensation reaction in xylene to give such a product mixture. It is of course not necessary to obtain the starting carbinol by the above outlined method, since it can be made by a number of known and readily available processes. Also, it is preferable but not absolutely necessary to have present in the reaction mixture at least 25% of the inert hydrocarbon diluent. The appropriate mixture is kept in storage tank 1 from which flow is continuously maintained through pipe 2 either by means of natural hydraulic pressure or from a superimposed gaseous pressure above the liquid level in tank 1 or by use of a pump 4 in line 2. Flow control and measuring meter 3 in line 2 regulates the continuous flow of the feed mixture to hydration reactor 12 during the dehydration period of the cycle. The mixture of feed containing the dimethylvinylethinylcarbinol is passed through line 2 into vaporizer 5 which imparts a temperature of at least 150° C. in order to substantially completely convert the mixture into the vapor state. This prevents any substantial condensation of the feed mixture in line 6 through which the mixture passes to juncture 7. At this point there is injected into the feed mixture a sufficient amount of superheated steam to adjust and maintain at all times during the dehydration cycle at least 5 moles of water to one mole of carbinol and a maximum of 18 moles of water to one mole of carbinol. The optimum ratio of water to carbinol is between 9 and 12 to 1. The total super heat of the steam added at juncture 7 should be sufficient to prevent any substantial condensation of any part of the feed mixture as it passes through line 8 to dehydration reactor 12. The mixture is initially passed into a preheater section 11 of the reactor 12. The space reactor velocities found to be optimum are from about 500 to 7,000 v./v./hr. and the preferred temperatures which are maintained in the preheater and reactor sections are from 250° to 300° C. with the optimum conditions being closer to the higher temperature (300° C.). The added steam injected at juncture 7 may be fresh water added to the system via line 14 or it may be recycle water added via line 25, from separator drum 15. Valve 16 is used to control steam heated in heater 13.

The mixed carbinol, xylene, and steam flow through line 8 and through juncture 9 and into preheater section 11 of the reactor 12. During the dehydration period of the cycle valves 3, 16, 40 and 41 are open and valves 42 and 63 are closed. In preheat section 11 the mixture is brought up to the appropriate reaction temperature and is passed directly into the reaction chamber which is filled with an alumina bed. The bed consists of particles of 8 to 14 mesh size. The temperature of the dehydrator reactor 12 both in the catalyst section and in the preheat section are controlled and maintained by burner 18 or which may be an electric heater if desired. As the carbinol feed contacts the dehydration catalyst it is dehydrated to form methyldivinylacetylene therefrom. The space velocity may vary from 500 to 7000 v./v./hr. It should be of sufficient time to permit adequate and practical conversion levels and yet not be so long as to cause extensive resinification ad polymerization of the feed and by-products.

The hot product gases, consisting primarily of unreacted carbinol, converted divinyl acetylene product, resins, xylene, water, and other higher molecular by-products leave the catalyst chamber 17 and are immediately and directly contacted with an excess of water injected via inlet 19. The water thus injected quenches the reaction and cools and condenses both the unreacted feed and the products. The quenched product leaves quench chamber 20 and passes through valve 41 via line 21 into separator drum or decanter 15 in which two layers are formed, a lower water layer and an upper organic layer, containing unreacted carbinol and products. The non-condensable off-gases obtained may be burned to heat the reactor 12 in burner 18, if desired. At least a part of the water layer may be recirculated by passage from the lower portion of the separator 15 and by means of pump 22, passed through lines 23, 24, and 25 for use as a recycle stream as the steam diluent; or, it may be used as a recycle quench stream via pump 22, lines 23, 24, and 26. Any unused portion may be discarded via drain 27.

The organic layer in separator 15, containing the desired product, the methyldivinylacetylene, is passed through line 29 and collected in an accumulator 28, flow being maintained by pump 30 or by its own hydraulic pressure head. From accumulator 28, the flow of the organic fraction is controlled by valve 62 and is passed into a distillation column 32 wherein it is subjected to fractional distillation. The vapor stream passing overhead is the desired methyldivinylacetylene, in a substantially pure state. It is condensed in condenser 34 and passed via line 35 into collector 36, from which at least a part is returned via line 38 to column 32 as liquid reflux and at least a part is passed via lines 37 and 39 to product storage tank 44. Operating in the above described fashion and under the above outlined conditions a conversion of between 65% and 100% is obtained per pass of feed. The bottoms stream from column 32 is removed therefrom by line 47 and is passed into heater 46. A part is returned to column via line 45 and a part is passed via line 49 through pump 48 and into column 50. This stream consists primarily of heavy higher boiling condensation products and the inert organic diluent, xylene. Within column 50 this fraction is subjected to fractional distillation. The volatile overhead fraction consisting substantially of xylene is removed via line 51 and is condensed in condenser 52 and passed into collector 54 via line 53. A part of the liquid is returned via line 55 to column 50 as reflux and at least a part is passed via lines 56, 57, and juncture 58 into the initial feed system as recycle to the dehydration zone. The remainder of the solvent recycle stream in line 56 is removed from the system via line 59, and can, if desired, be passed to a condensation system for preparation of the carbinol reactant as briefly outlined above. The heavy non-volatile residual products in the feed to column 50 are passed from the bottom of column 50 via line 60, through heater 61, from which a part is recycled into column 50 via line 64 and a part is removed from the system.

After the dehydration period has operated on stream for example, 7–12 hours the exact time depending on the size of the operating unit, the alumina particles of catalyst become fouled and coated with carbonaceous deposits and a catalyst regeneration cycle must be used to regenerate the spent catalyst in catalyst chamber 17. This is done by closing valves 3, 16, 40 and 41, and opening valves 42 and 63. Air is passed through the catalyst bed in chamber 17 for a period of time and at such a rate that the carbon is burned but the catalyst is not permitted to be overheated. Preferred conditions are to regulate the air flow rate to keep the temperature rise of the catalyst below 1000° C. The combustion gases so formed as a result of the burning of the carbonaceous material from the catalyst are vented through valve 42 and vent 43. The regeneration cycle for the catalyst is over when the vent gases indicate, by CO and $CO_2$ analyses, that substantially all of the carbon has been burned away. Before admitting organic feed vapors to repeat the dehydration cycle, it is necessary to purge the system of air by closing valve 63, opening valve 16 and admitting steam to line 8, preheat section 11, catalyst chamber 17, and quench chamber 20. Residual air and steam are vented via vent 43, and the dehydration cycle is repeated as herein above described. The alternate cycles of dehydration and regeneration can be repeated as long as desired in continuous operation.

*Example 3*

One hundred cubic centimeters of alumina catalyst F-10 (Aluminum Company of America) was brought to a temperature of 302° C. Steam was allowed to pass over it at an average rate of 36 gm./hr. for a period of three hours and twenty minutes in order that it attain equilibrium with respect to water vapor. A mixture of dimethylvinylethinylcarbinol and xylene, 25.6 and 74.4 weight percent respectively was vaporized and passed over the catalyst at an average rate of 80.5 gm./hr., the water vapor continued at the aforementioned rate. Samples were taken every hour for a total of seven hours. The following table indicates the exact yields of methyl divinyl acetylene obtained.

| Time, hrs.: | Percent yield |
|---|---|
| 1 | 75.4 |
| 2 | 80.1 |
| 3 | 79.2 |
| 4 | 79.6 |
| 5 | 78.4 |
| 6 | 80.1 |
| 7 | 79.7 |

This data indicates that after a process operating time of 7 hours, or of a total time in excess of 10 hours, the catalyst showed no evidence of deactivating.

The temperatures employed in effecting the process may vary widely, however, in general it has been found that temperatures ranging from about 150° C. to about 400° C. are ordinarily satisfactory. The following example indicates that the preferred temperature range lies from about 250° C. to about 300° C.

*Example 4*

A catalyst chamber measuring approximately one inch in diameter and seven inches long and filled with 100 cc. of alumina F-10 catalyst was maintained over its length at a temperature of 201° C.±1° C. A carbinol-xylene mixture, as used in Example 3, above was allowed to flow over the catalyst at a rate of 47.6 grams per hour. The water to carbinol ratio was maintained at approximately 12 to 1. Ultraviolet analysis of the products indicated that methyl divinyl acetylene was obtained in a yield of 71%. In similar manner at 250° C. a yield of 70.7% was obtained. At 300° C. the yield obtained was 80.5%.

Investigation of the effect of flow rate was conducted at 300° C. The following example serves to illustrate the fact that acceptable yields may be obtained over a wide range of flow rates, varying from total space velocities of about 500 to about 12,500 v./v./hr., based on the vapor at standard conditions. The preferred range is in the region of about 7,000 to about 500 v./v./hr.

*Example 5*

A mixture of the tertiary acetylenic carbinol in xylene, as described previously, was passed over alumina F-10 catalyst maintained at about 300° C. The water to carbinol ratio was regulated at about 11 to 1. Ultraviolet absorption analysis of the products issuing from the catalyst chamber are recorded below.

| Space velocity, v./v./hr.: | Mole percent yield |
|---|---|
| 548 | 80.5 |
| 854 | 78.5 |
| 1,245 | 78.0 |
| 1,833 | 78.5 |
| 2,915 | 83.4 |
| 4,620 | 74.4 |
| 6,700 | 59.9 |
| 12,190 | 43.0 |

Another variable that effects the quantity of dehydration product obtained is the water to carbinol ratio. The moles of water to moles of carbinol can be varied over wide limits, from 1 to an excess of 25. However, it was found that the best results were obtained in the range of about 5 to about 18 moles of water to moles of carbinol. This can be seen clearly from the following examples.

*Example 6*

On noting the high yields obtained at 300° C. with a water to carbinol ratio of 11, as illustrated in Example 5, above the determination of the effect of lowering the ratio of water used was studied. The catalyst and the organic feed were the same as described previously. Ratio of reduced water to carbinol was 6.6/1. Ultraviolet analysis of the products issuing from the catalyst chamber indicated the following yields.

Space velocity, v./v./hr.:     Mole percent yield
- 1,475 _____ 57.2
- 1,853 _____ 58.0
- 3,200 _____ 47.5
- 4,600 _____ 36.2

This indicates that at least at 300° C., the higher water to carbinol ratios are preferable.

Example 7

At 250° C. the water to carbinol ratio was varied from about 1 to about 25. The catalyst was the same as used previously and ultraviolet analysis of the products are tabulated below.

Water to carbinol ratio:     Mole percent yield
- 0.9 _____ 47.8
- 5.3 _____ 41.1
- 11.5 _____ 77.8
- 18.1 _____ 35.6
- 24.9 _____ 36.6

What is claimed is:

1. A process for the production of divinyl acetylenes which comprises contacting a tertiary vinyl acetylenic alcohol with a solid alumina catalyst in the presence of steam, the mole ratio of steam to alcohol being maintained at least greater than 1 to 1 during the catalyst contact period and at a temperature between about 150° and 400° C.

2. A process for the production of divinyl acetylenes which comprises contacting a tertiary vinyl acetylenic alcohol in vapor phase with a solid alumina catalyst in the presence of steam, the mole ratio of steam to alcohol being maintained at least greater than 1 to 1 during the catalyst contact period, and in the presence of an inert, hydrocarbon diluent, at a temperature between about 150° and 400° C. and at flow rates of about 500 to about 12,500 v./v./hr.

3. A continuous process for the production of divinyl acetylenes which comprises passing a vaporous mixture of a tertiary vinyl acetylenic alcohol, and steam into a catalytic zone containing solid alumina catalyst, immediately and directly thereafter quenching the hot vaporous products, and thereafter separating a divinyl acetylene from the reaction products.

4. A cyclic process for the production of divinyl acetylenes which comprises initially a dehydration cycle which comprises contacting a vaporous mixture of a tertiary vinyl acetylenic alcohol, an inert, hydrocarbon diluent, and steam with a solid alumina dehydration catalyst at a temperature between about 150° and 400° C. and at flow rates of about 500 to about 12,500 v./v./hr., then a regeneration cycle which comprises contacting said solid alumina catalyst with oxygen, air, or steam to remove carbonaceous deposits from said catalyst and alternately and continuously repeating said dehydration and regeneration cycles.

5. A process for the production of methyl divinylacetylene which comprises contacting dimethylvinylethinylcarbinol with a solid alumina catalyst in the presence of steam, the mole ratio of steam to carbinol being maintained at least greater than 1 to 1 during the catalyst contact period and at a temperature between 250° and 300° C.

6. A continuous process for the production of methyl divinylacetylene which comprises continuously passing a vaporous mixture of dimethylvinylethinylcarbinol, an inert, hydrocarbon diluent, and steam into a catalytic zone containing solid alumina dehydration catalyst, immediately and directly thereafter quenching the hot, vaporous products, and thereafter subjecting said products to fractional distillation to recover methyl divinylacetylene therefrom.

7. A cyclic process for the production of methyl divinylacetylene which comprises initially a dehydration cycle which comprises containing a vaporous mixture of dimethylvinylethinylcarbinol, an inert, hydrocarbon diluent, and steam with a solid alumina dehydration catalyst at a temperature between about 250° and 300° C. and at flow rates of about 500 to 7,000 v./v./hr., then a regeneration cycle which comprises contacting said solid alumina catalyst with air to remove carbonaceous deposits from said catalyst and alternately and continuously repeating said dehydration and regeneration cycles.

References Cited in the file of this patent

UNITED STATES PATENTS

| Number | Name | Date |
|---|---|---|
| 1,944,153 | Mueller-Cunradi | Jan. 23, 1934 |
| 2,197,956 | Vaughn | Apr. 23, 1940 |
| 2,310,809 | Reppe et al. | Feb. 9, 1943 |
| 2,737,537 | Taylor et al. | Mar. 6, 1956 |
| 2,763,703 | Happel et al. | Sept. 18, 1956 |